United States Patent
Trechsel

[19]

[11] Patent Number: 5,806,287
[45] Date of Patent: Sep. 15, 1998

[54] ON-THE-GO CHECK WEIGH SYSTEM

[75] Inventor: Hans Trechsel, Rockford, Minn.

[73] Assignee: Dimension Automation, Inc., Maple Grove, Minn.

[21] Appl. No.: 844,600

[22] Filed: Apr. 21, 1997

[51] Int. Cl.⁶ .................................................. B65B 1/46
[52] U.S. Cl. .................................. 53/502; 53/55; 53/251; 53/473; 177/52
[58] Field of Search .................................. 53/502, 55, 495, 53/493, 52, 249, 250, 251; 177/53, 52, 125

[56] References Cited

U.S. PATENT DOCUMENTS

| | | | |
|---|---|---|---|
| 2,818,888 | 1/1958 | Atwood et al. | 53/502 X |
| 3,484,813 | 12/1969 | Davis | 177/52 X |
| 4,632,254 | 12/1986 | Scopatz | 53/502 X |
| 4,890,441 | 1/1990 | Meerkate et al. | 53/502 X |
| 5,004,093 | 4/1991 | Blezard | 177/52 X |
| 5,434,366 | 7/1995 | Troisi | 177/52 |

OTHER PUBLICATIONS

TL Systems Corporation, *Clean Room Automation*, (Pamphlet, pp. 1–4) (No Date).

*Primary Examiner*—James F. Coan
*Attorney, Agent, or Firm*—Jacobson & Johnson

[57] ABSTRACT

A method and apparatus for testing a batch of containers to determine if the containers have been filled with product to the proper volume with the apparatus including a conveyor for moving empty containers from a first location to a second location, a filling head for filling a batch of individual containers, a checkweigh platform for receiving a batch of individual empty containers from the conveying line and individually weighing each of the containers in both the empty condition and the filled condition and a robotic arm for transporting the containers to and from the conveying line and within the checkweighing station.

15 Claims, 8 Drawing Sheets

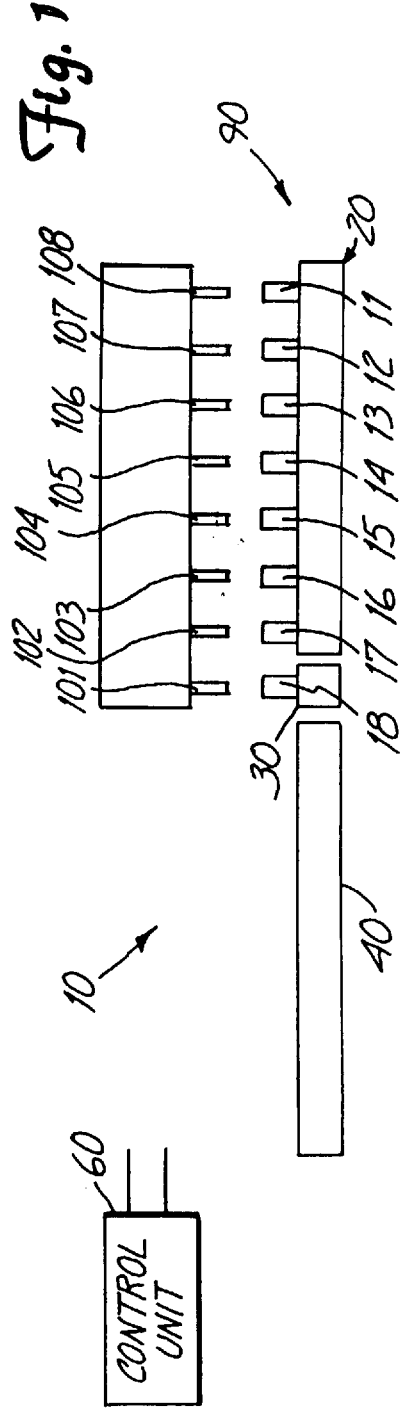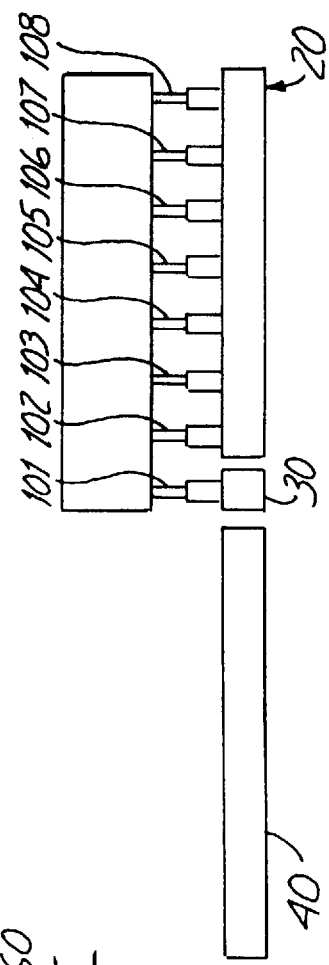

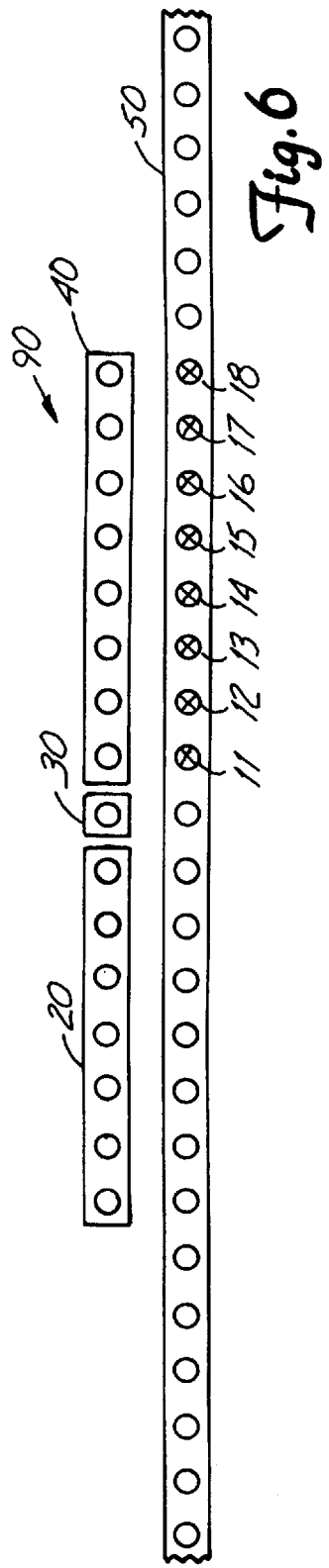
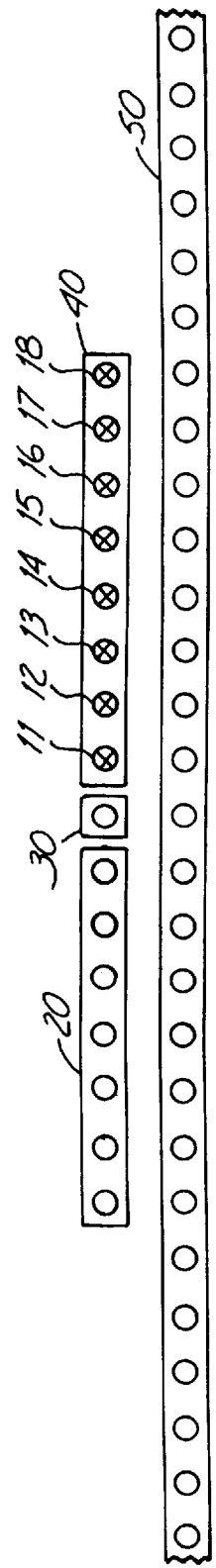
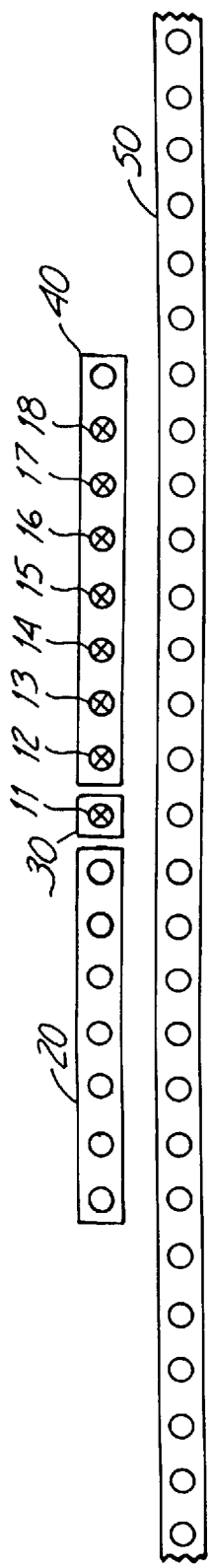

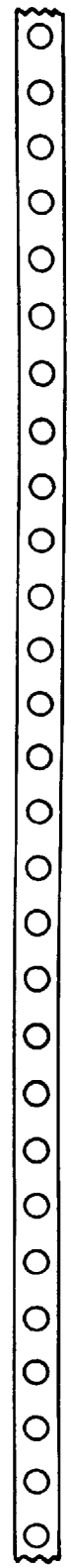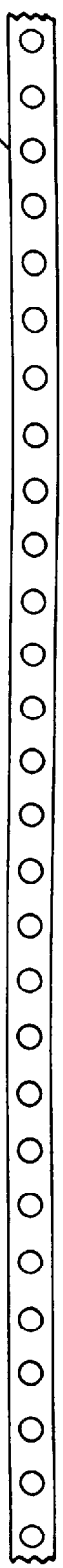

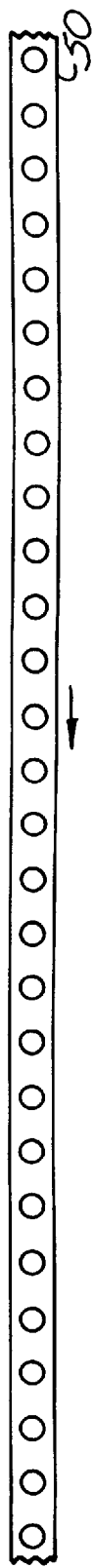
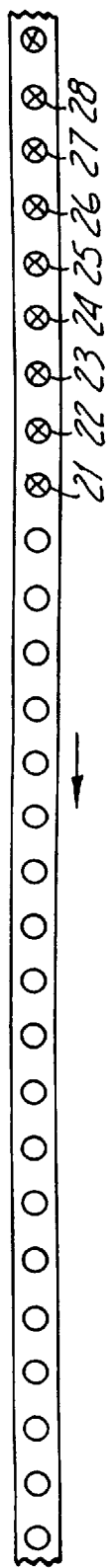
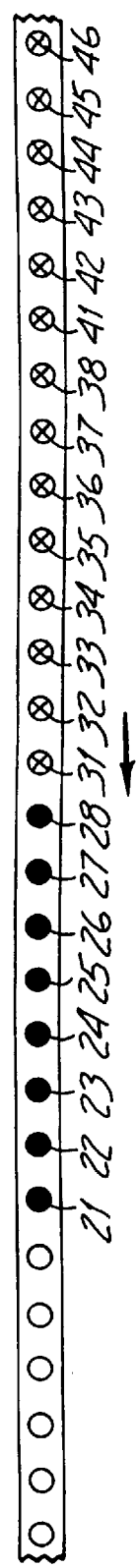

ON-THE-GO CHECK WEIGH SYSTEM

FIELD OF THE INVENTION

This invention relates generally to weighing systems, and, more particularly, to an on-the-go checkweighing systems for periodically weighing a selective set of containers and their contents to determine whether the containers are being filled to the proper volume.

BACKGROUND OF THE INVENTION

One of the difficulties in filling containers in a continuous moving conveying line is that a number of factors affect whether the system fills the containers to the proper volume. For example, if multiple scales are used to weigh the containers differences in calibration of the scales can produce discrepancies in the amount of product placed in the containers. If multiple pumps are used, filling errors can occur because of the differences in pump performances as fluid is pumped into a container. While checking the weight of each container could ensure that proper amount of product is placed into the container the weight checking of each container unnecessarily slows the conveying line.

In volume filling, the pumps used to fill the containers are displacement pumps that deliver a predetermined amount of fluid during each stroke of the pump. To minimize filling errors the containers on the conveyor are filled on a regular cycle. That is, the filling head regularly fills a batch of containers every few seconds. When checking the filling of the containers on-the-go one does not want to change the filling cycle by speeding up or slowing down the filling cycle. However, if containers are to be checkweighed on a separate weighing platform one needs to double fill during a portion of the cycle, that is, one needs to fill a batch of containers on the conveying line as well as a batch of containers on a weighing platform. To ensure that pumping errors are not introduced by speeding up or slowing down the filling cycle one maintains the filling cycle at the same regularity but temporarily slows down the conveyor line in order to fill the batch of containers on the conveyor as well as the batch of containers on the weighing platform.

In order to determine if the containers are filled to the proper volume one of the prior art systems uses a checkweigh system that uses two robotic arms, the first robotic arm removes a single empty container from the conveying line, weighs the empty container on a first scale and returns the empty container to the conveying line. The container is then filled. The second robotic arm removes the filled container from the conveying line, weighs the filled container on a second scale and then returns the filled container to the conveying line.

In such a system not all containers are checked to determine if the containers are properly filled, instead periodically a single filled container is removed from the system, weighed to determine whether the system is placing the proper amount of product into the containers and then the filled container is returned to the conveying system. Thus, based on a statistical testing model, one should be able to determine with relatively certainty if the proper amount of product is being placed into the containers by periodically testing a container to determine if the container is filled within the prescribed range. However, errors can be introduced by equipment that can render the statistical testing ineffective. For example, if multiple pumps are used in order to simultaneously fill multiple containers any differences in output between the pumps can produce an error in filling a particular set of containers. If one of the pumps should go bad the offending pump might not be detected for some time since the weight testing of a single container could not detect the bad pump until a container filled from the bad pump was removed from the conveying line and weight checked.

The present invention allows one to remove a batch of empty containers from a conveying line and then individually weigh each of the batch of empty containers on a single weigh scale to eliminate calibration errors between scales. After weighing each of the individual empty containers in the batch of empty container, the containers are filled and then each of the filled containers are individually weighed with the same scale to determine whether they are filled within the prescribed limits. If they are not filled within the prescribed limits, a control signal can be sent to increase or decrease the amount of product being placed in the containers. In case of extreme malfunction, a signal can be sent to stop the conveying system until the filling errors have been corrected.

The present invention uses a minimum of mechanical transfer devices and reduces the need for changing the system for different size containers. In addition the system provides for a controlled start up with all filling systems checked before the system is allowed to begin continually filling the containers. With the present system one can have the conveyor line full under the normal filling conditions for a product which can be either fluid or solid.

SUMMARY OF THE INVENTION

Briefly the invention comprises a method and apparatus for testing a batch of containers to determine if the containers have been filled with product to the proper volume with the apparatus including a conveyor for moving empty containers from a first location to a second location, a filling head for filling a batch of individual containers, a checkweigh platform for receiving a batch of individual empty containers from the conveying line and individually weighing each of the containers in both the empty condition and the filled condition and a robotic arm for transferring the containers to and from the conveying line and within the checkweighing station.

BRIEF DESCRIPTION OF THE DRAWINGS

FIG. 1 is a partial schematic front view of a checkweigh system including a filler head and a checkweigh platform;

FIG. 2 is a partial schematic front view checkweigh system shown in FIG. 1 with the filler head located in a filling position;

FIG. 6 is a top schematic view of the checkweigh platform holders and the conveying line with a plurality of empty containers located in the conveying line;

FIG. 7 is the top schematic view of FIG. 6 with the plurality of empty containers located in a pre-staging platform;

FIG. 8 is the top schematic view of FIG. 6 with one the plurality of empty containers moved from the pre-staging platform to the weigh scale;

FIG. 9 is the top schematic view of FIG. 6 showing the plurality of empty containers moved to the post staging platform;

FIG. 10 is the top schematic view of FIG. 6 showing the empty container filled while in the post-staging platform;

FIG. 11 is the top schematic view of FIG. 6 showing the filled containers moved to the pre-staging platform;

FIG. 12 is the top schematic view of FIG. 6 showing one of the filled containers moved into a weigh scale in the post-staging platform;

FIG. 13 is the top schematic view of FIG. 6 showing the filled containers moved to the left end of the post-staging platform and a plurality of unfilled containers in the conveying line;

FIG. 14 is the top schematic view of FIG. 6 showing the filled containers moved to the post-staging platform and a plurality of filled and unfilled containers in the conveying line;

Figures 15, 16, 17:
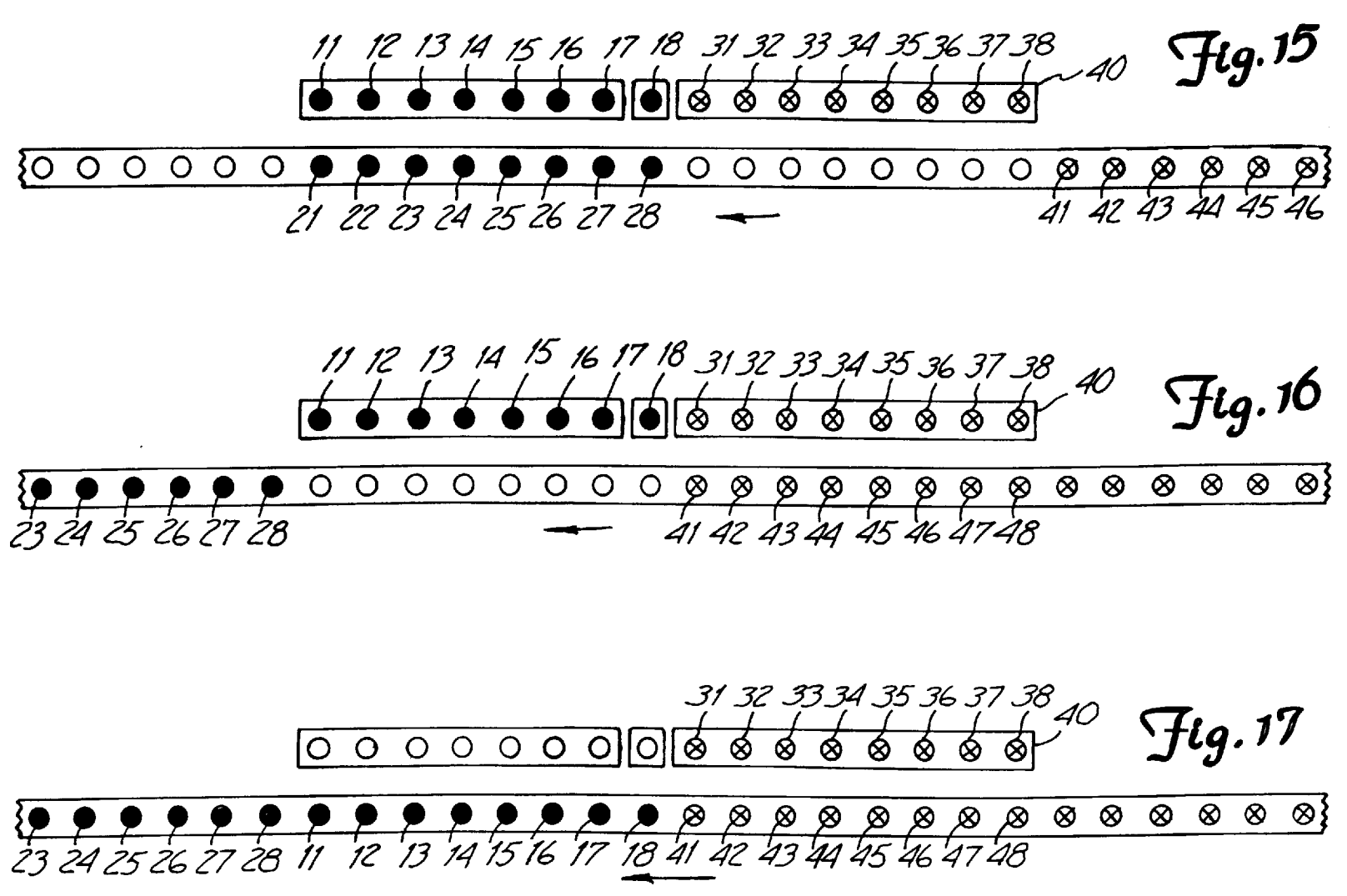

FIG. 15 is the top schematic view of FIG. 6 showing the filled containers in the post-staging platform and a plurality of unfilled containers transferred from the conveying line to the pre-staging platform;

FIG. 16 is the top schematic view of FIG. 6 showing the filled containers in the post-staging platform located opposite the empty holders in the conveying line;

FIG. 17 is the top schematic view of FIG. 6 showing the filled containers in the post-staging platform transferred to empty holders in the conveying line.

DESCRIPTION OF THE PREFERRED EMBODIMENT

Figure 3:
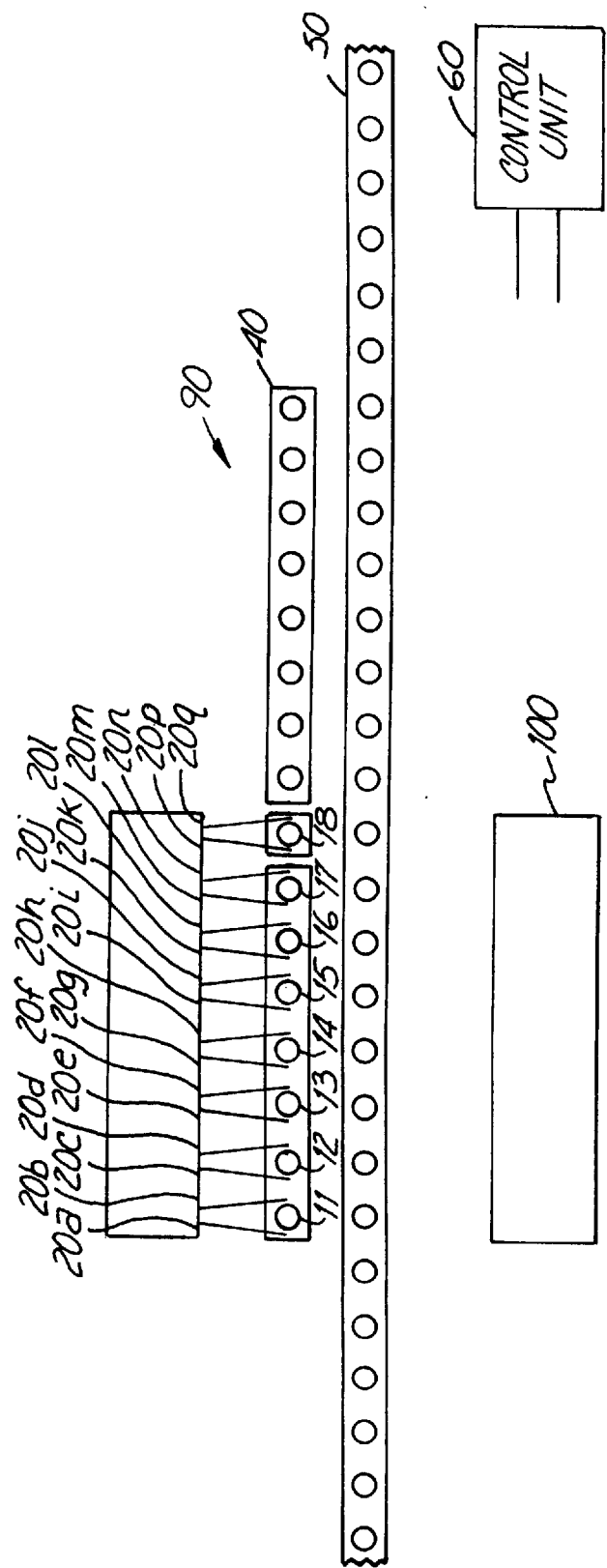
FIG. 3 is a top partial schematic top view of the checkweigh system of FIG. 1 showing the filler head and the robotic arm positioned next to the checkweigh platform.

Referring to the drawing, FIG. 1 is a partial schematic front view of a checkweigh system 10 including a filler head 107, a control unit 60 and a checkweigh platform 90 comprised of a pre-staging platform 40 and a post-staging platform 20 which includes a single weight checking scale 30. The filler head 100, which is positionable by a mechanical arm (not shown) is shown located in a prefilling position above a number of empty containers 11, 12, 13, 14, 15, 16, 17, and 18 which are held in an upright condition in post-staging platform 20. Each of the filling spouts 101, 102, 103, 104, 105, 106, 107, and 108 are located above one of the empty containers 11–18 so that the spouts can be lower into the open top of the containers. In the present invention each of the eight filling spouts is connected to a separate filling pump (not shown) to enable one to simultaneously and quickly fill eight separate containers.

FIGS. 1 shows the filling head in the prefilling position and FIGS. 2 to FIG. 6 illustrate the different actions of the filling head 100 and the robotic arm 70 as a batch of containers are filled and checked to determine if the containers are filled to the proper volume.

FIG. 2 shows filler head 100, which is controlled by the control unit 60 and positionable by a mechanical arm (not shown), in a lower filling condition to enable one to transfer product through filler tubes 101 through 108 into the batch of open-top containers 11 through 18 which are located in the post-staging platform 20.

It should be pointed out in FIGS. 3–FIG. 17 that for ease in understanding the invention empty containers are designated with a cross and filled containers are designated by a solid circle. In addition connecting links between the control unit 60 and robotic arm 70, weigh scale 30 and filling head 100 have been omitted for ease in understanding the on-the-go method of checkweighing a batch of containers from a continually moving conveyor line.

FIG. 3 shows a top partial schematic view of the checkweigh system of FIG. 1 and the conveying line 50. FIG. 3 also shows the filler head 100 in 2. non filling position with the filler head laterally spaced from the conveying line 50. The robotic arm 70 is positioned laterally and proximate the post-staging platform 20 in checkweigh platform 90. Robotic arm 70 has a set of eight container grippers that are ganged to an arm (not shown) so the grippers can be simultaneously opened and closed to permit weighing and transferring of the containers. The eight container grippers include grip arms 70a and 70b; grip arms 70c and 70d; grip arms, 70e and 70f; grip arms 70g and 70h; grip arms, 70i and 70j; grip arms, 70k and 70l; grip arms 70m and 70n; and grip arm 70p and 70q with each of the grippers located in an open condition. Note, that grip arms 70p and 70q are spaced from container 18 to permit the weighing of container 18 without influence of the grip arms 70p and 70q.

In the position shown in FIG. 3, grip arms 70p and 70q are shown in a spread-apart condition and spaced apart from the empty container which is denoted by the a cross 18 within a container holder located within post-staging platform 20. Similarly, the cross x within post-staging platform 20 which are identified as reference numerals 11, 12, 13, 14, 15, 16, 17 and 18 indicate that all eight containers are in an empty condition. The conveying line 50 is shown to have a plurality of cylindrical container holders, which are identified by regular spaced circles. That is, the cylindrical container holders can hold containers in an upright condition as the containers are moved along conveyor line 50.

Figure 4:
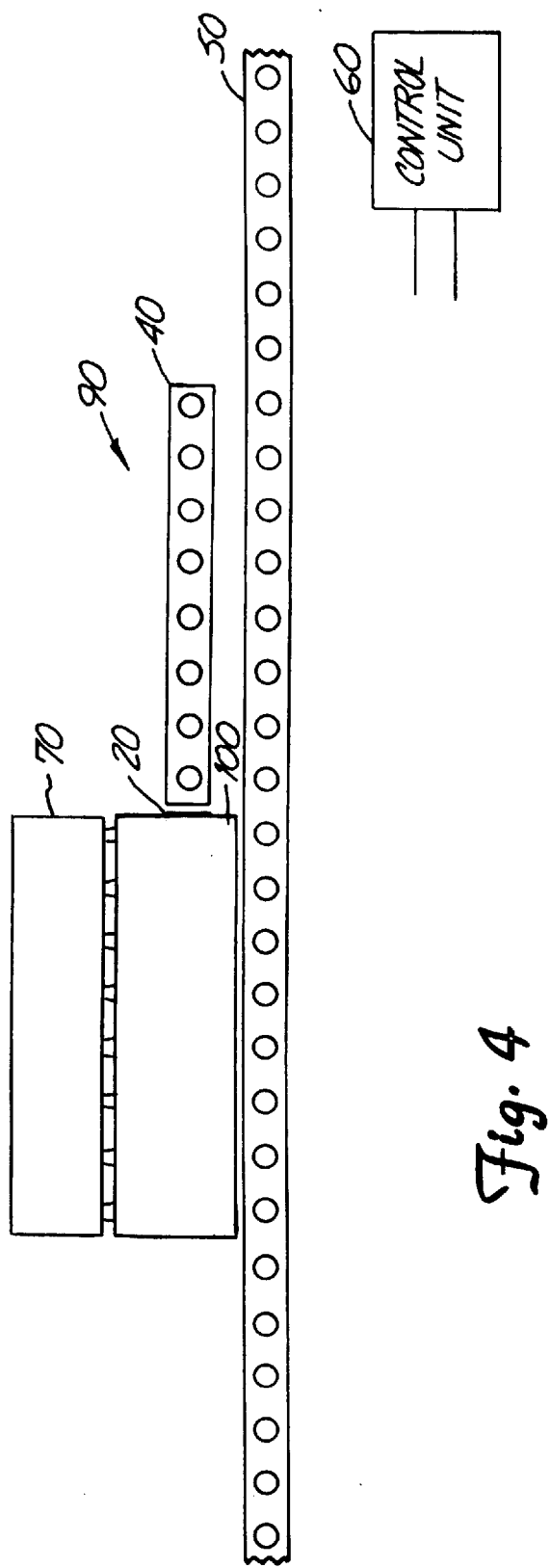
FIG. 4 is a top partial schematic top view similar to FIG. 3 showing the filler head located in a filling condition over a plurality of containers located in the checkweigh platform.

FIG. 4 shows a top partial schematic view, similar to FIG. 3, showing the filler head 100 located in a filling condition over the plurality of empty containers 11 through 18 located in the post-staging platform 30.

Figure 5:
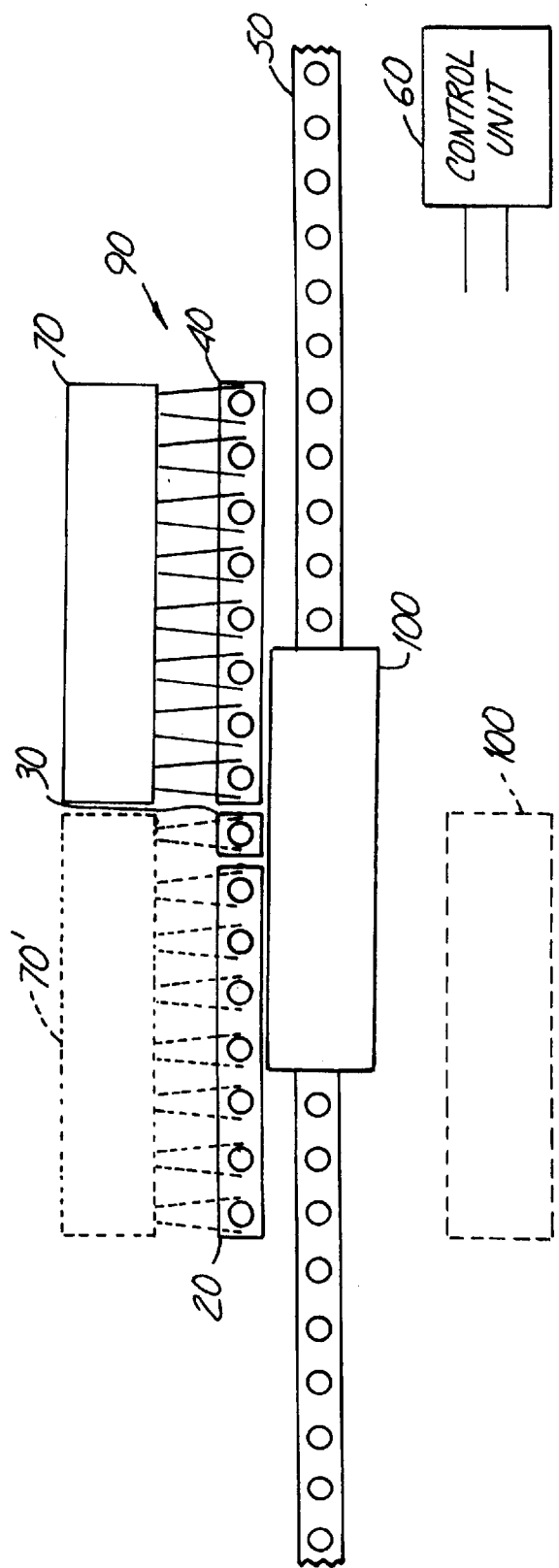
FIG. 5 shows a top partial schematic top view similar to FIG. 3 showing the filler head located in a filling condition over a plurality of container in the conveying line.

FIG. 5 shows a top partial schematic view, similar to FIG. 4, showing the respective positions of the robotic arm 70 and the filler head 100 during portions of the cycle. That is, the filler head 100 is shown in a filling condition over conveyor line 50 and would normally move back to the position indicated by dotted line 100' when the containers have been filled. Similarly, the robotic arm 70 is shown in a gripping position on empty containers located in pre-staging platform 40 and in dotted condition 70' located in post-staging platform 20.

Thus FIG. 1 to FIG. 5 illustrate the various action positions of the filler head 100 and the robotic arm 70 with respect to both the checkweigh platform 90 and the conveyor line 50. Both the filler head 100 and the robotic arm are controlled by control unit 60 which can be a preprogrammed personal computer.

To understand the operation of the system in terms of the selective removal of containers from the conveying line, refer to FIGS. 6 through 17 which show a series of sequential steps involved in the checkweighing of a product. To simplify understanding, the filler head 100, the connecting system and associated control unit 60 as well as the robotic arm 70 have been omitted from the schematic views with the empty containers indicated by an x and the filled containers indicated by a solid circle. To illustrate the operation of the system FIG. 6 shows the system in the start up condition where the first batch of containers are checked to determine if they are filled within proper limits. In the start up condition the conveyor line is not filled with containers until the initial batch of containers has been checkweighed. After the initial batch of containers has been checkweighed the conveyor line 50 is maintained in a full condition as illustrated in FIG. 16 and 17.

FIG. 6 shows a partial top schematic view illustrating pre-staging platform 40, weigh scale 30 and post-staging platform 20 as well as conveying line 50. A plurality of holders is indicated by circles located within conveying line 50 and within the pre- and post-staging platforms 20 and 40. To illustrate operation of the system, there are shown eight open top containers 11 through 18 located in an upright condition and indicated by the mark x in conveyor line 50. The empty containers are moved right to left along a conveyor line 50 from a first location when they are in the empty condition to a second location when they are in a full condition. As the containers are being moved along the conveyor line 50 at a first speed, the containers move opposite of a set of empty container holders located in pre-staging platform 40. In this condition, the robotic arm picks up containers 11 through 18 in conveyor line 50 and transfer them to pre-staging platform 40.

FIG. 8 shows containers 11 through 18, which have been moved to pre-staging platform 40 by robotic arm 70, are being moved one at a time onto weigh scale 30. In this position, weigh scale 30 weighs the individual empty container. The conveying line 50 continues at the high speed.

The batch of empty containers 11–18 selected for check-weighing are coordinated with the number of pumps so that a container filled from each of the pumps will be checked each time a batch of containers are selected for checkweighing. In addition, by using only one scale, the errors of calibration are eliminated so that one is ensured that the errors are kept within a controlled limit.

FIG. 9 shows the batch of containers 11–18 in the unfilled condition in post-staging platform 20.

FIG. 10 shows that the filling head has filled containers 11 through 18 to a pre-determined amount. The pre-filled containers are located in pre-staging platform 20 are identified by solid circles and numerals 11 through 18.

FIG. 11 shows the plurality of containers 11 through 18, which have been filled in the post-staging platform 20, have been moved to the pre-staging platform 40 by robotic arm 70 in order to begin the process of individually weighing each of the containers 11–18.

The process of weighing of the filled containers 11 through 18, is now ready to be initiated. FIG. 12 shows pre-filled containers 11 through 18 moved one at a time to weigh station 30 so that the weight of each of the containers can be recorded. That is, container 11 is shown in scale 30 and can be individually weighed. During the weighing process the gripper on the robotic arms are opened( see FIG. 3) so that the true weight of the filled container can be determined.

FIG. 13 shows the completion of the weighing cycle during startup where each of containers 11 through 18 have been weighed with container 18 located in weight scale 30. In addition, a second batch of empty containers 21 through 28 are now in conveying line 50 and are moving toward the left. The system is now ready for selective batch testing of a conveyor line while maintaining the conveyor line in a full condition.

FIG. 14 shows containers 21 through 28 have been filled with the filling head 100 while containers 11 through 18 remain in post-staging platform 40. (Conveying line 50 now includes a batch of empty containers 31 through 38 as well as a batch of empty containers 41 through 48 and so on. That is, empty containers will be continually carried from right to left by the conveying line 50.

To facilitate transfer of containers between the check-weigh platform 90 and the conveyor line 50 the conveyor line is slowed down during the lateral transfer of containers between the checkweigh platform 90 and the conveyor line 50. That is, the conveyor line 50 is slowed down as empty containers 31–38 are transferred from conveyor 50 to pre-staging platform 40 and when containers 11–18 are transferred from post-staging platform 20 to conveyor line 50. Thus during the transfer cycle the conveyor is slowed down to facilitate transfer of containers to and from the conveyor line. Once the transfer is completed the conveyor line is speed up to its normal speed. Thus the present invention, allows the conveyor line to run at is normal speed except for a small portion of the cycle when containers are being transferred to and from the conveyor line.

FIG. 15 shows containers 31 through 38 located in conveying line 50 have been picked up and transferred by the robotic arm to the pre-staging platform 40. The check-weigh platform now includes a set of eight empty containers 31 through 38 and a set of eight full containers 11 through 18. As noted in FIG. 15, there is now a gap of eight empty spaces in the conveying line 50 with the empty spaces located between filled container 28 and empty container 41.

FIG. 16 shows the containers in conveying line 50 have been moved to the left so that the empty spaces which normally held containers 31 through 38 are now located opposite the filled containers 11 through 18 which are located in post-staging platform 20. In this condition, robotic arm 70 (FIG. 2–5) simultaneously grasps and engages containers 11 through 18 and transfers containers 11 through 18 into the empty spaces in conveying line 50 as shown in FIG. 17. The conveyor line 50 now resumes full normal speed.

The system continues while empty containers 31 through 38 in the post-staging platform 40 repeat the weigh cycle illustrated in FIGS. 7 through 16 to individually weigh each of the containers in the unfilled condition as well as the filled condition.

One of the features of the present invention is that the conveying line can be operated at two different speeds. That is when the empty containers are being removed from the conveying line and being checked for correct weight the conveying line is temporarily slowed down to provide sufficient time to remove the empty containers from the conveying line and place the filled containers back in the empty spaces occupied by the empty containers that were removed from the conveyor line. Consequently, except for the times when the containers are being double filled or when the containers are being transferred between the checkweigh platform and the conveyor line the conveyor can operate at a faster speed. It should be pointed out that in some instances the speed of the conveyor line may be sufficiently slow so that the conveyor line does not have to be slowed down to accomplish the transfer of containers to and from the conveyor line.

Thus the present invention provides a method of on-the-go checkweighing a batch of eight containers that are being continually conveyed from a first location in an unfilled condition to a second location where they are removed in a filled condition comprising the steps of:

1. Conveying a set of empty containers along a conveyor line from a first location toward a second location at a first speed.
2. Temporarily conveying the set of empty containers in the conveyor line at a second slower speed.
3. Simultaneously transferring eight empty containers from the conveyor line to a pre-staging platform while continuing to operate the conveyor line at the second slower speed and resuming the first conveyor speed after the transfer of containers is completed.
4. Moving the empty containers one at a time onto a scale to determine the weight of each of the empty containers.

5. Moving the empty containers to a post-staging platform after the empty containers have been weighed.
6. Filling each of the empty containers after the empty containers have been weighed.
7. Transferring the filled empty containers to the pre-staging platform.
8. Moving the filled containers one at a time onto a scale to determine the weight of each of the filled containers.
9. Temporarily slowing down the conveyor line and transferring the filled containers from the post-staging platform back to a space in the conveyor line previously occupied by the filled containers when the filled containers were in an empty condition on the conveyor line.
10. Returning the conveyor line to the first speed after the filled containers are transferred to the conveyor line.
11. On-the-go adjusting the amount of filling of the set of empty containers in order to fill the set of empty containers to a predetermined volume.

The present invention provides both an apparatus and method for multiple filling and multiple testing of containers to determine if the containers have been properly filled while requiring only periodic slow down of the conveying line. Thus the conveying line can run at the normal speed during most of the operation and only needs to be slowed down for a few seconds during the double fill portion of the cycle and during the transfer cycle when the empty containers are removed from the conveying line and replaced by the filled containers.

I claim:
1. A checkweigh system comprising:
   a set of containers each having an open top for filling each of the containers in the set of containers;
   a conveyor line for conveying the set of containers in an upright condition from a first location where the set of containers are in an unfilled condition to a second location where the set of containers are in a filled condition;
   a pre-staging platform for receiving a portion of the set of containers from the conveyor line;
   a scale for selectively weighing an individual container of the portion of the set of containers in both an unfilled condition and a filled condition
   a post-staging platform for temporarily holding the portion of the set of container transferred from the conveyor line;
   a robotic arm for transferring the portion of the set of containers from the conveyor line to the pre-staging platform and from the pre-staging platform to the post-staging platform; and
   a filling head for filing the set of containers to the filled condition while the set of containers are in either the conveyor line or the post-staging platform.
2. The checkweigh system of claim 1 including a control system for determining if each of the filled containers have been filled within a set of prescribed limits.
3. The checkweigh system of claim 1 including a set of pumps connected to said filling head for simultaneously and individually filling empty containers in either said post-staging platform or said conveyor line.
4. The checkweigh system of claim 2 including a set of pumps connected to said filling head for simultaneously and individually filling empty containers in either said post-staging platform or said conveyor line.
5. The checkweigh system of claim 4 including at least 8 pumps and at least 8 spouts on said filling head for simultaneously and individually filling at least 8 empty containers.
6. The checkweigh system of claim 5 wherein the post-staging platform and the conveyor line are located in a parallel and spaced condition from each other.
7. The checkweigh system of claim 6 wherein the post-staging platform, the scale and the pre-staging platform are located in line with each other.
8. The checkweigh system of claim 7 wherein the post-staging platform, the scale and the pre-staging platform each have individual container holders for the empty containers with each of the individual container holders spaced equal distance from an adjacent container holder to permit transfer of the containers as a group into any set of container holders.
9. The checkweigh system of claim 8 wherein the robotic arm includes grippers for opening and closing to permit the grasping and releasing of containers as the containers are moved from and to the conveyor line.
10. The method of checkweighing a set of containers that are being conveyed from a first location in an unfilled condition to a second location in a filled condition comprising the steps of:
    conveying a set of empty containers along a conveyor line from the first location toward the second location at a first speed;
    temporarily conveying the set of empty containers in the conveyor line at a second speed;
    simultaneously transferring at least two of the empty containers from the conveyor line to a pre-staging platform while the conveyor line is moving at the second speed;
    moving the at least two empty containers one at a time onto a scale to determine the weight of each of the empty containers;
    moving the at least two empty containers to a post-staging platform after the at least two empty containers have been weighed;
    temporarily slowing down the conveyor line to the second speed while filling each of the at least two empty containers;
    transferring the filled at least two empty containers to the pre-staging platform;
    moving the filled at least two containers one at a time onto a scale to determine the weight of each of the filled at least two containers;
    transferring the at least two filled containers from the post-staging platform back to a space in the conveyor line previously occupied by the at least two filled containers when the at least two filled containers were in an empty condition on the conveyor line; and
    on-the-go adjusting the amount of filling of the set of empty containers in order to fill the set of empty containers to a predetermined volume.
11. The method of claim 10 including the step of periodically removing at least eight containers from the conveying line.
12. The method of claim 10 including the step of filling at least two containers with a liquid.
13. The method of claim 12 including temporarily slowing the conveyor line while empty containers are being removed from the conveyor line.
14. The method of claim 13 including temporarily slowing the conveyor line while the full containers in the pre-staging platform are being transferred to the conveyor line.
15. The method of claim 14 including the step of removing as many containers from the conveyor line as there are pumps filling the container in the conveyor line.

* * * * *